United States Patent
Quinn et al.

(10) Patent No.: US 8,366,386 B2
(45) Date of Patent: Feb. 5, 2013

(54) METHOD AND ASSEMBLY FOR GAS TURBINE ENGINE AIRFOILS WITH PROTECTIVE COATING

(75) Inventors: Daniel E. Quinn, Windsor, CT (US); David J. Hiskes, Vernon, CT (US); Carl W. Mercier, S. Willington, CT (US); Michael Minor, Arlington, TX (US); Paul M. Pellet, Arlington, TX (US); Michael L. Miller, Euless, TX (US)

(73) Assignee: United Technologies Corporation, Hartford, CT (US)

(*) Notice: Subject to any disclaimer, the term of this patent is extended or adjusted under 35 U.S.C. 154(b) by 963 days.

(21) Appl. No.: 12/360,312

(22) Filed: Jan. 27, 2009

(65) Prior Publication Data

US 2010/0189555 A1    Jul. 29, 2010

(51) Int. Cl.
*F04D 29/44* (2006.01)
(52) U.S. Cl. .......... 415/200; 156/182; 29/888.021; 29/888.01; 416/241 B
(58) Field of Classification Search .......... 29/889.1, 29/888.021; 416/241 B; 415/200
See application file for complete search history.

(56) References Cited

U.S. PATENT DOCUMENTS

| | | | |
|---|---|---|---|
| 4,015,910 A | | 4/1977 | Harmon et al. |
| 4,098,559 A | | 7/1978 | Price |
| 4,153,005 A | | 5/1979 | Norton et al. |
| 4,176,433 A | * | 12/1979 | Lee et al. ............... 29/889.1 |
| 4,248,940 A | | 2/1981 | Goward et al. |
| 4,878,953 A | * | 11/1989 | Saltzman et al. .......... 148/512 |
| 5,087,477 A | | 2/1992 | Giggins, Jr. et al. |
| 5,174,715 A | * | 12/1992 | Martin ............... 415/209.4 |
| 5,305,726 A | | 4/1994 | Scharman et al. |
| 5,601,652 A | | 2/1997 | Mullin et al. |
| 5,735,673 A | | 4/1998 | Matheny et al. |
| 6,190,124 B1 | | 2/2001 | Freling et al. |
| 6,270,318 B1 | | 8/2001 | Shah et al. |
| 7,326,470 B2 | * | 2/2008 | Ulion et al. ............. 428/469 |

* cited by examiner

*Primary Examiner* — Chuong A Luu
*Assistant Examiner* — Robert Bachner
(74) *Attorney, Agent, or Firm* — Carlson, Gaskey & Olds PC

(57) ABSTRACT

A method of processing turbine airfoils includes depositing a protective coating on first and second turbine airfoils, and bonding the first and second turbine airfoils together after the deposition such that there is an open throat between the first and second turbine airfoil and at least portions of surfaces in the open throat are coated with the protective coating.

10 Claims, 3 Drawing Sheets

METHOD AND ASSEMBLY FOR GAS TURBINE ENGINE AIRFOILS WITH PROTECTIVE COATING

BACKGROUND OF THE INVENTION

This disclosure relates to gas turbine engine airfoils and, more particularly, to improving the durability of protective coatings applied to the airfoils.

Gas turbine engine airfoils typically include a protective coating to improve durability against erosion, corrosion, and the like. However, the coating may have numerous drawbacks. For instance, the coating may be vulnerable to spallation under thermal stresses during engine operation. Additionally, turbine airfoils may be fabricated as doublets (e.g., vane doublets) with two airfoils bonded together at inner and outer platforms. The structure of the doublet may hinder deposition of the coating, especially on surfaces between the airfoils.

SUMMARY OF THE INVENTION

An example method of processing turbine airfoils includes depositing a protective coating on first and second turbine airfoils, and bonding the first and second turbine airfoils together after the deposition such that there is an open throat between the first and second turbine airfoil and at least portions of surfaces in the open throat are coated with the protective coating.

An example turbine airfoil assembly includes a first turbine airfoil and a second turbine airfoil that is bonded to the first turbine airfoil such that there is an open throat between the first turbine airfoil and the second turbine airfoil. At least portions of surfaces in the open throat include a protective coating.

The turbine airfoil assembly may be included within a turbine section of a gas turbine engine. For instance, the gas turbine engine may include a compressor section, a combustor that is fluidly connected with a compressor section, and the turbine section located downstream from the combustor.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
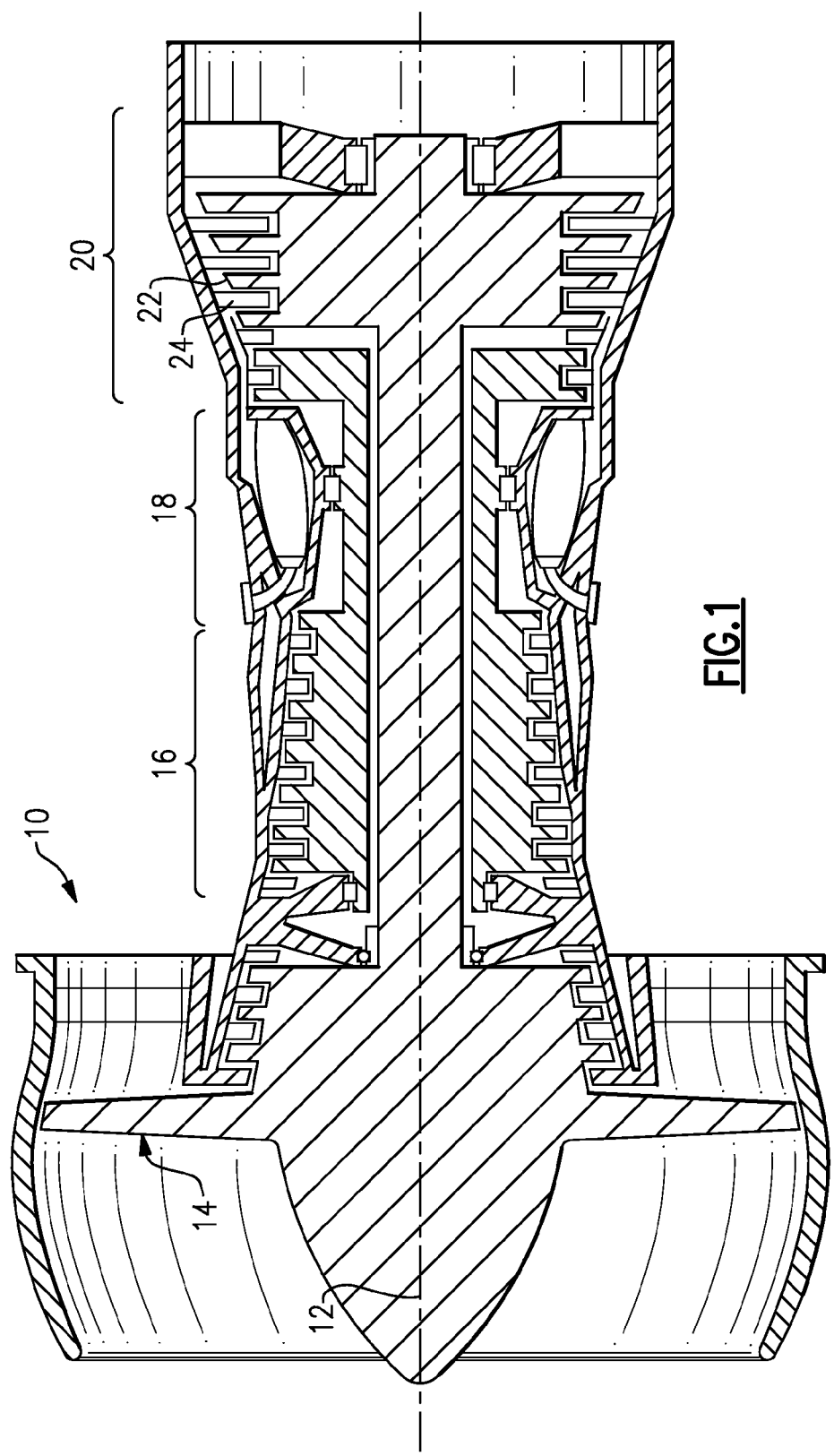
FIG. 1 illustrates an example gas turbine engine.

FIG. 1 illustrates selected portions of an example gas turbine engine 10, such as a gas turbine engine 10 used for propulsion. In this example, the gas turbine engine 10 is circumferentially disposed about an engine centerline 12. The engine 10 may include a fan 14, a compressor section 16, a combustion section 18, and a turbine section 20 that includes rotating turbine blades 22 and static turbine vanes 24. It is to be understood that other types of engines may also benefit from the examples disclosed herein, such as engines that do not include a fan or engines having other types of compressors, combustors, and turbines than shown.

Figure 2:
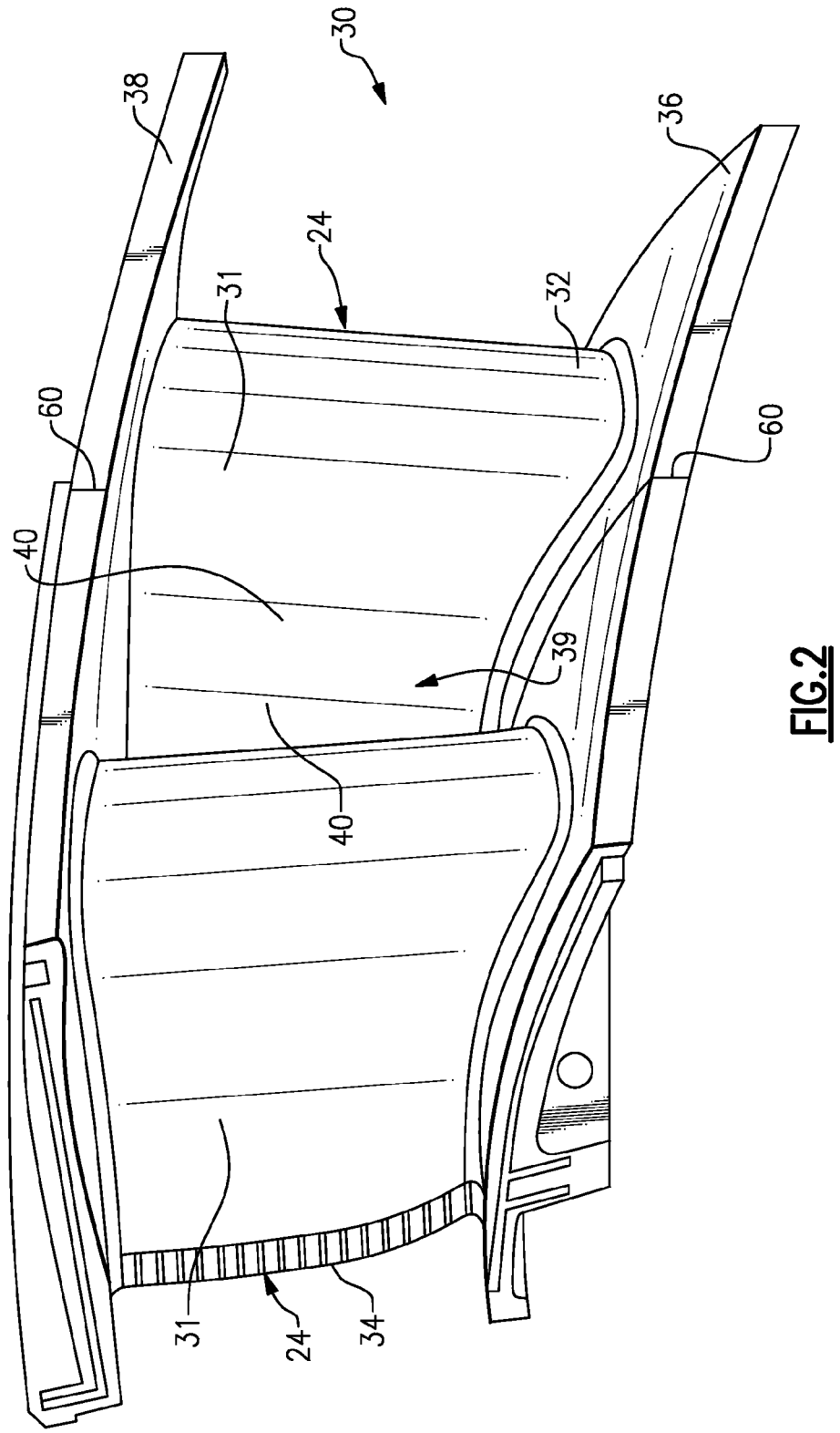
FIG. 2 illustrates an example turbine airfoil assembly from the gas turbine engine.

FIG. 2 illustrates selected portions of a turbine airfoil assembly 30 that includes two of the turbine vanes 24 (i.e. first and second turbine airfoils) bonded together to form a doublet. Generally, each of the turbine vanes 24 includes an airfoil-shaped section 31 that extends between a leading edge 32, a trailing edge 34, an inner platform 36, and an outer platform 38. An open throat 39 extends between the airfoil-shaped sections 31. As is known, the turbine vanes 24 may include other structures that are not shown here, such as seals, film-cooling orifices, etc.

The inner platform 36 and the outer platform 38 may include known joining features for connecting to other turbine vane assemblies or structural members for securing the turbine airfoil assembly 30 within the gas turbine engine 10. Each turbine vane 24 may be regarded as a turbine airfoil and it is to be understood that the examples herein may also apply to the turbine blades 22 or other airfoils within the gas turbine engine 10.

The turbine airfoil assembly 30 includes a protective coating 40 for protecting against erosion, corrosion, or the like. In this example, the protective coating 40 is deposited at least on portions of the surfaces in the open throat 39 and, optionally, may be applied such that the protective coating 40 extends entirely around at least each airfoil-shaped section 31 of the turbine vanes 24. The protective coating 40 may also be deposited onto the inner platform 36 and outer platforms 38 as desired.

Figure 3:
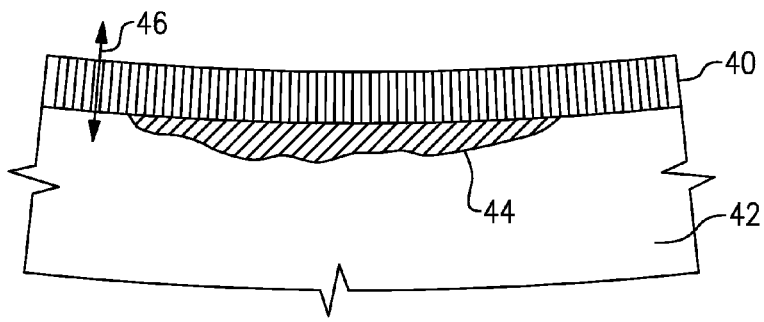
FIG. 3 illustrates a portion of the turbine airfoil assembly.

FIG. 3 illustrates a cross-section from a portion of the open throat 39. The protective coating 40 is deposited onto a base substrate 42, such as a nickel-based alloy. The base substrate 42 may also include a known bond coat (not shown), such as MCrAlY or aluminide for oxidation resistance, underlying the protective coating 40. In an MCrAlY bond coat, the M may include at least one of nickel, cobalt, iron, or a combination thereof, Cr is chromium, Al is aluminum, and Y is yttrium.

In the illustrated example, the base substrate 42 includes a braze alloy 44 from a repair process. For instance, the turbine airfoil assembly 10 may be engine-used for a period of time and exhibit erosion, surface cracking, or the like. A technician may repair the damaged areas by preparing the damaged areas in a known manner and depositing the braze alloy 44. It is to be understood however, that this disclosure is not limited to a repair environment and the examples herein may also be applied in other instances, such as in an original fabrication process or as an upgrade of a new article.

The type of protective coating 40 may vary, depending on the needs of a particular application. In one example, the protective coating 40 is a ceramic coating. For instance, the ceramic coating may include yttria-stabilized zirconia. Alternatively, the protective coating may be metallic, such as a metallic alloy. Given this description, one of ordinary skill in the art will recognize other types of protective coatings 40, ceramics, or metallic materials to meet their particular needs.

The protective coating 40 includes a local coating orientation 46 that is approximately perpendicular to a local portion of the surface on which the protective coating 40 is deposited. For instance, even though the portion of the open throat 39 illustrated in FIG. 3 is curved, the local orientation 46 at each location along the protective coating 40 is perpendicular to the immediately underlying surface of the base substrate 42. As will be described below, the perpendicular orientation is a result of the processing technique used to deposit the protective coating 40 onto the base substrate 42. In this case, the perpendicular orientation provides a strong bond between the protective coating 40 and the base substrate 42 that is highly resistant to spalling compared to transversely oriented coatings. It is to be understood that the coating orientation may not be exactly perpendicular but may vary within a range of ±45° and still be considered perpendicular. The coating orientation may alternatively be within a range of ±22.5° and be considered perpendicular. In another example, the coating orientation may, on average, be within a few degrees of perpendicular and be considered perpendicular.

Figure 4:
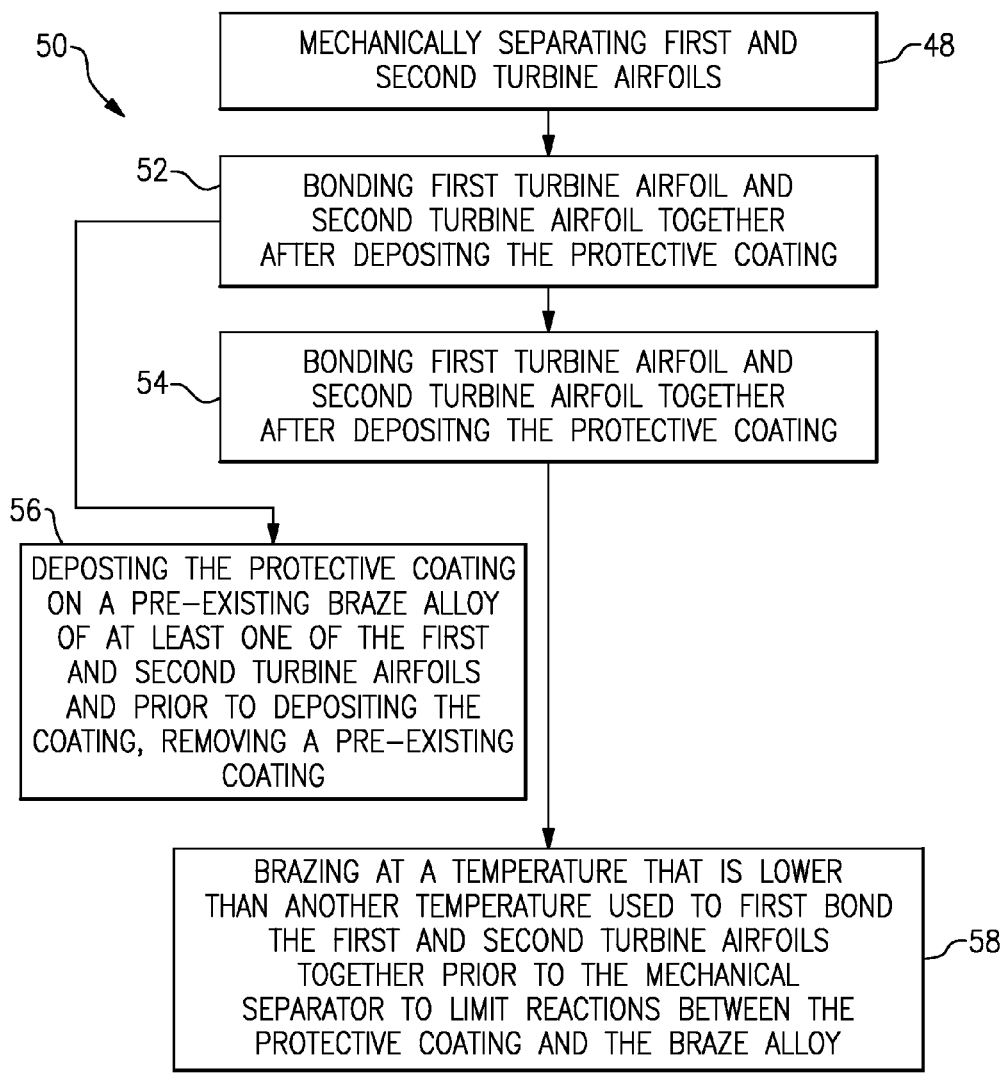
FIG. 4 illustrates an example method of processing turbine airfoils.

FIG. 4 illustrates an example method 50 of processing turbine airfoils to produce the turbine airfoil assembly 30 described above. For instance, the method 50 may be used as a repair to refurbish used turbine airfoil assemblies 30 after a period of use in the gas turbine engine 10, to upgrade new turbine airfoil assemblies 30, or in an original manufacturing process to produce the turbine airfoil assemblies 30. Thus, the method 50 may be adapted to the particular processing environment in which it is intended to be used.

The method 50 includes a separation step 48, a deposition step 52 and a bonding step 54. The method 50 is described with regard to the turbine airfoil assembly 30, but it is to be understood that the examples herein may also apply to an assembly of the turbine blades 22 or other airfoils of the gas turbine engine 10.

The separation step 48 includes mechanically separating turbine vanes 24. The deposition step 52 includes depositing the protective coating 40 onto the turbine vanes 24. The bonding step 54 includes bonding the turbine vanes 24 together after the deposition step 52. Bonding after the deposition step 52 allows the protective coating 40 to be deposited on each individual turbine vane 24 in the desired perpendicular orientation, without hindrance from the other turbine vane 24. For instance, the protective coating 40 can be deposited with the desired perpendicular orientation onto the surfaces of each of turbine vanes 24 that form the open throat 39.

The deposition step 52 is not limited to any particular technique but may include electron beam physical vapor deposition, high velocity oxy-fuel deposition, or plasma deposition. Each of the given example deposition techniques are line-of-sight processes that are not capable of depositing the protective coating 40 on the surfaces of the open throat 39 with the desired perpendicular orientation if the turbine vanes 24 are bonded together. In this regard, a technician may mechanically separate at 48 the turbine vanes 24 of the turbine airfoil assembly 30 before the deposition step 52, if the turbine vanes 24 are initially bonded together (as they would be for a repair, an upgrade of a new assembly, or possibly in an original fabrication process), to permit coating the surfaces of the open throat 39. The turbine airfoil assembly 30 may be mechanically separated along a joint 60 (FIG. 2), such as a braze joint, and then coated in a known manner using a selected deposition technique. It is to be understood that the illustrated configuration of the joint 60 with regard to location, shape, etc. may vary from the illustrated configuration. Additionally, the above technique of coating the separate turbine vanes 24 before bonding may also apply to other types of deposition processes that cannot deposit coatings in tight spaces, such as plating processes (e.g., electrodeposition).

The turbine vanes 24 are then bonded together after the deposition step 52. For example, the bonding step 54 may include brazing or welding to connect (or reconnect) the turbine vanes 24 together along the joint 60.

Depending on the application, the above technique of coating the separate turbine vanes 24 before bonding may not be as straightforward as merely rearranging the steps in a pre-existing given fabrication process. For instance, the turbine vanes 24 and turbine airfoil assembly 30 are subject to other processing steps before or after depositing the protective coating 40 that may influence the characteristics of the turbine vanes 24 and/or turbine airfoil assembly 30. The following examples illustrate the influence of coating the separate turbine vanes 24 before bonding the turbine vanes 24 together.

The method 50 may include additional steps, depending on the intended application of the method 50. For instance, for a repair or upgrade, the method 50 may include stripping off existing coatings at step 56, cleaning, removing damaged areas, and/or rebuilding eroded portions of the turbine vanes 24 using the braze alloy 44, also at step 56. The braze alloy 44 may have a similar nickel-based composition as the nickel-based alloy of the base substrate 42. Some typical braze alloys that are used for repair processes may later react with the protective coating 40, and in particular ceramic, to form undesirable phases when exposed to elevated temperatures during the bonding step 54. In this case, using the higher melting temperature braze alloy 44 limits inter-diffusion and thereby reduces interaction between the braze alloy 44 and the protective coating 40. Additionally, the temperature of the bonding step may be reduced from a normally used temperature in combination with using the higher melting temperature braze alloy 44 to further limit any reaction between the braze alloy 44 and the protective coating 40. For instance, the selected temperature may be lower than a temperature used to first bond the turbine vanes 24 together in a prior fabrication process, as shown at step 58.

Additionally, the protective coating 40 may be subject to damage during the fabrication process. Damaging a protective coating is perhaps not as great of a concern in processes where coating deposition occurs after bonding as one of the last steps in fabrication. However, coating before bonding as in method 50 may have an influence on numerous additional process steps, such as cleaning, grinding or mechanical preparation of mating surfaces, laser drilling, etc. In this regard, a fabricator may protect the turbine vanes 24 from mechanical damage after depositing the protective coating 40 using a protective covering, such as a plastic sheet, masking, or the like.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of processing turbine airfoils, comprising:
   (a) mechanically separating first and second turbine airfoils;
   (b) after the said step (a), depositing a protective coating on first and second turbine airfoils, including depositing the protective coating on a pre-existing braze alloy of at least one of the first and second turbine airfoils and, prior to depositing the protective coating on first and second turbine airfoils, removing a pre-existing coating; and
   (c) bonding the first and second turbine airfoils together after depositing the protective coating such that there is an open throat between the first and second turbine airfoils, and at least a portion of surfaces in the open throat are coated with the protective coating, wherein the bonding includes brazing at a temperature that is lower than another temperature used to first bond the first and second turbine airfoils together prior to the mechanical separating of said step (a) to limit reactions between the protective coating and the pre-existing braze alloy.

2. The method as recited in claim 1, wherein the depositing of the protective coating includes using a line-of-sight deposition process.

3. The method as recited in claim 2, wherein the line-of-sight deposition process is electron beam physical vapor deposition.

4. The method as recited in claim 2, wherein the line-of-sight deposition process is selected from a group consisting of high velocity oxy-fuel deposition and plasma deposition.

5. The method as recited in claim 1, wherein the depositing of the protective coating includes establishing a local coating orientation in the open throat that is perpendicular within a range of ±45° to a local portion of the surface on which the protective coating is deposited.

6. The method as recited in claim 1, further comprising protecting the first and second turbine airfoils with a protective covering between the depositing of the protective coating and the bonding of the first and second turbine airfoils.

7. The method as recited in claim 1, wherein the first and second turbine airfoils are engine-used.

8. The method as recited in claim 1, wherein the depositing of the protective coating using a line-of-sight deposition process to establish a local coating orientation in the open throat that is perpendicular within a range of ±45° to a local portion of the surface on which the protective coating is deposited.

9. The method as recited in claim 1, wherein the protective coating is a ceramic coating.

10. The method as recited in claim 9, wherein the ceramic coating includes yttria-stabilized zirconia.

* * * * *